2,901,367
Patented Aug. 25, 1959

2,901,367

LOW FIRED SILICA BRICK

Hobart M. Kraner, Bethlehem, Pa., assignor to Bethlehem Steel Company, a corporation of Pennsylvania No Drawing. Application September 10, 1956
Serial No. 608,717

2 Claims. (Cl. 106—69)

This invention relates to a low fired, intermediate density refractory silica brick, particularly suitable for use in the hot patching of open hearth furnace endwalls, but also suitable for use in soaking pits, fantail roofs, and wherever resistance to thermal shock is desirable and limited growth is either desirable or unimportant.

In the operation of open hearth furnaces, portions of the end walls fail due to the unequal action of destructive forces within the furnace. To extend the life of the furnace, and postpone the time when the entire furnace must be shut down for a major rebuilding, it is general practice to temporarily repair, or hot patch, the failed portions of the end walls while the furnace is still in operation or is still red hot. As this hot patching is done at very high temperatures, the refractory brick is subjected not only to intense heat, but also to the great thermal shock which results from injecting a cold brick into such a hot environment.

Refractory brick made of silica is desirable for use in the endwalls, because silica has a combination of properties not found in other materials, such as high refractoriness, expands rather than shrinks at high temperatures, has excellent resistance to deformation under load at temperatures close to its melting point, and has good resistance to attack by most fluxes. Unfortunately, silica brick has poor resistance to thermal shock, and spalls severely below 600° C., when heated rapidly.

The purpose of this invention is to develop a refractory silica brick which is not only highly refractory, but which will also resist the thermal shock encountered in hot patching.

A further purpose is a refractory silica brick which will undergo a limited amount of permanent expansion, or growth, during use, to close up the customarily loose patchwork construction.

Silica brick spalls when heated rapidly to 600° C. because it undergoes sudden, severe expansions in volume, said expansions being caused by the inversion of one crystalline form of silica to another.

Silica has three basic crystalline structures, namely quartz, cristobalite and tridymite. Quartz and cristobalite each have two forms, alpha and beta. Silica as found in nature is almost entirely alpha quartz, but on heating inverts to other crystalline forms. At about 573° C. alpha quartz inverts to beta quartz, accompanied by a sudden expansion sufficient to rupture the brick upon rapid heating. The beta quartz is then stable until about 870° C. at which temperature it slowly and irreversibly begins to invert to beta cristobalite, the rate of inversion increasing with an increase in temperature. This inversion is accompanied by a large increase in volume, but, since the inversion is slow, the increase in volume is correspondingly slow, and the brick is not put under a severe strain. Silica brick is normally inverted to cristobalite prior to use, to avoid this large growth or permanent expansion which the brick would otherwise undergo when in use. Between 870° C. and 1470° C. the cristobalite very slowly inverts to tridymite, with very little change in volume. Above 1470° C. cristobalite is stable, and any tridymite present will slowly invert back to cristobalite. Beta cristobalite, when cooled, inverts to alpha cristobalite, in the temperature range of 220–275° C. Alpha cristobalite, when heated, inverts back to beta cristobalite in the temperature range of 200–240° C., and this inversion is also accompanied by a sudden severe expansion sufficient to rupture the brick upon rapid heating.

Because of the drastic expansion characteristics of cristobalite at 200–240° C. and of quartz at 573° C. a silica brick predominantly quartz, such as unfired silica brick, or predominantly cristobalite, such as regular fired brick, is unsuitable for hot patching. A silica brick composed primarily of tridymite is the most desirable for hot patching, since it has excellent resistance to thermal shock and spalling. This excellent resistance to spalling is due to the fact that tridymite does not undergo sudden severe expansions, as do quartz and cristobalite. However, the rate of inversion of cristobalite to tridymite is so slow, and the length of firing so long, that the cost of such a brick is prohibitive. But, a silica brick containing large amounts of both quartz and cristobalite has its rapid expansion spread over two temperature ranges and the brick is therefore under less strain and less likely to spall at any given temperature than it would be if composed chiefly of quartz or cristobalite.

The degree to which a silica brick will resist thermal shock, and how much permanent expansion it will undergo during use, depends in large measure on the amount of unconverted quartz which is present after firing. Excessive quartz will cause rupture at 573° C. and will grow more than is necessary to close up the patchwork, resulting in damage to the construction. This excessive growth will also cause the brick to spall, for the hot end of the brick will expand more than the cold end, setting up severe stresses within the brick. If there is insufficient quartz present, the brick will rupture and spall when heated rapidly through the temperature range of 200–240° C., due to the presence of excessive cristobalite, and will not grow sufficiently to close up the patchwork.

I have found that a silica brick containing 25–50% quartz and 25–50% cristobalite is the most satisfactory for hot patching. Some tridymite will likely be present, its amount depending upon the firing time and temperature. The amount of tridymite present is not critical, but it is desirable to have as much present as possible.

The density of silica brick varies according to its crystalline structure. Quartz has a density of 2.65, cristobalite has a density of 2.32, and tridymite has a density of 2.26. The silica brick of my invention, containing 25–50% quartz and 25–50% cristobalite, has a density of 2.39 to 2.46, the exact figure depending on the amounts of each crystalline form present.

It is well known that the presence of excessive alumina and alkali in silica brick greatly reduces the refractoriness of the brick. Therefore, to achieve the high refractoriness required of a silica brick to be used for hot patching, I use a silica relatively free of alumina and alkali, the amount of alumina and alkali not exceeding 1%.

The silica brick of my invention is made by forming, by any well known method, a raw silica material containing not more than 1% alumina and alkali, slowly heating the brick through the critical low temperature range, and then soaking the brick at 1315–1470° C. (Cone 13–16) for the period of time necessary to obtain the desired crystalline structure. The total heating time and the soaking time will vary considerably, and depend on many factors familiar to those skilled in the art. However, a total heating time of 6–8 days and a soaking time of 10–24 hours will usually suffice. This is not the only temperature range which can be used for firing, but it is by far the most desirable. Firing above 1470° C. is undesirable for two reasons: (1) The rate of inversion of quartz to cristobalite is so rapid that it is difficult to control the firing time to get the desired quantities of quartz and cristobalite and (2) less tridymite is formed. If the firing is done below 1315° C. the rate of inversion of quartz to cristobalite is unnecessarily slow, thereby increasing the firing time and the cost of the brick.

An example of my invention is a silica brick containing .85% alumina and alkali which was soaked at about 1315–1350° C. for 10–12 hours with a total heating time of about 7 days. This brick contained 42% quartz, 33% cristobalite, and 22% tridymite, and had a density of 2.42. When tested under actual operating conditions, it lasted 2–10 days longer than silica brick predominantly quartz or cristobalite, or containing more than 1% alumina and alkali.

I claim:

1. A fired refractory silica brick which before firing and after forming consists essentially of unfired silica material, said fired brick having a density of 2.39–2.46 and containing essentially quartz and cristobalite, each being present in an amount of about 25–50%, balance if any, tridymite, and having present, if any, not more than 1% total amount of alumina and alkali.

2. A fired refractory silica brick which before firing and after forming consists essentially of unfired silica material, said fired brick having a density of approximately 2.42 and containing approximately 42% quartz, 33% cristobalite, 22% tridymite and having present, if any, not more than 1% total amount of alumina and alkali.

References Cited in the file of this patent

UNITED STATES PATENTS

| | | |
|---|---|---|
| 701,707 | Gibson | June 3, 1902 |
| 701,708 | Gibson | June 3, 1902 |
| 1,969,751 | Heuer | Aug. 14, 1934 |
| 2,066,365 | Salmang et al. | Jan. 5, 1937 |

UNITED STATES PATENT OFFICE
CERTIFICATE OF CORRECTION

Patent No. 2,901,367                        August 25, 1959

Hobart M. Kraner

It is hereby certified that error appears in the printed specification of the above numbered patent requiring correction and that the said Letters Patent should read as corrected below.

Column 2, lines 48 and 49, for "density", each occurrence, read -- specific gravity --; line 50, for "density", each occurrence, read -- specific gravity --; same column 2, line 52, column 3, line 14, and column 4, lines 1 and 8, for "density", each occurrence, read -- specific gravity --.

Signed and sealed this 26th day of April 1960.

(SEAL)
Attest:

KARL H. AXLINE                            ROBERT C. WATSON
Attesting Officer                       Commissioner of Patents